US010255116B1

(12) United States Patent
Narayana et al.

(10) Patent No.: US 10,255,116 B1
(45) Date of Patent: Apr. 9, 2019

(54) METHOD OF REDISTRIBUTING ACCESS POINTS AUTOMATICALLY TO CONTROLLERS FOR RESTORING TOPOLOGY AND BALANCING LOAD

(75) Inventors: M. S. Badari Narayana, Santa Clara, CA (US); Kumara Das Karunakaran, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 642 days.

(21) Appl. No.: 12/847,599

(22) Filed: Jul. 30, 2010

(51) Int. Cl.
*G06F 15/177* (2006.01)
*G06F 9/50* (2006.01)
*H04L 12/923* (2013.01)
*H04L 12/803* (2013.01)

(52) U.S. Cl.
CPC .......... *G06F 9/5088* (2013.01); *H04L 47/125* (2013.01); *H04L 47/762* (2013.01)

(58) Field of Classification Search
CPC .... H04L 47/125; H04L 47/726; G06F 9/5088
USPC ................ 348/156; 709/226, 230, 220, 221; 455/422.1, 434, 435.3
See application file for complete search history.

(56) References Cited

U.S. PATENT DOCUMENTS

| | | | | |
|---|---|---|---|---|
| 6,055,433 | A * | 4/2000 | Yuan et al. | 455/453 |
| 8,213,933 | B2 * | 7/2012 | Lee | 455/434 |
| 8,619,549 | B2 | 12/2013 | Narayana et al. | |
| 8,824,448 | B1 | 9/2014 | Narayana et al. | |
| 2006/0094437 | A1 * | 5/2006 | Sinnarajah | H04W 36/22 455/452.1 |
| 2006/0252427 | A1 * | 11/2006 | Bridges et al. | 455/435.2 |
| 2008/0072047 | A1 * | 3/2008 | Sarikaya et al. | 713/171 |
| 2010/0279704 | A1 * | 11/2010 | Vachhani | H04W 76/18 455/453 |
| 2010/0290396 | A1 * | 11/2010 | Karunakaran et al. | 370/328 |
| 2011/0280213 | A1 * | 11/2011 | Calhoun et al. | 370/331 |

* cited by examiner

*Primary Examiner* — David R Lazaro
*Assistant Examiner* — Mariegeorges A Henry
(74) *Attorney, Agent, or Firm* — Stevens & Showalter, LLP

(57) ABSTRACT

A method, apparatus and computer program product for performing load balancing of SNDs and FNDs is presented. The presently disclosed method and apparatus for providing load balancing solves the problem of improper wireless traffic distribution in an enterprise network that may cause overload on some FNDs while some others are lightly loaded. The presently described methods and apparatus, by use of a single command, allow a user to restore the FNDs and SNDs to a preplanned topology or balance the load on controllers without overriding the manual assignments specified by the user.

12 Claims, 3 Drawing Sheets

100

102 RECEIVING A REDISTRIBUTE COMMAND AT A MOBILITY DOMAIN CONTROLLER (MDC) OF A MOBILITY DOMAIN (MD), THE MD INCLUDING AT LEAST ONE FIRST NETWORK DEVICE (FND) AND AT LEAST ONE SECOND NETWORK DEVICE (SND)

104 THE REDISTRIBUTE COMMAND RESTORES THE FNDS AND THE SNDS TO AN ORIGINAL CONFIGURATION

106 THE FND COMPRISES A WIRELESS CONTROLLER (WC) AND WHEREIN THE SND COMPRISES ONE OF THE GROUP CONSISTING OF AN ACCESS POINT (AP) AND A WIRELESS SWITCH (WS)

or

108 THE FND COMPRISES A WS AND WHEREIN THE SND COMPRISES AN ACCESS POINT (AP)

110 DETERMINING A PREFERRED FND FOR A SND

112 DETERMINING THE SND IS NOT CURRENTLY ASSOCIATED WITH THE PREFERRED FND

114 DETERMINING THE PREFERRED FND IS AVAILABLE

116 DETERMINING THE PREFERRED FND IS AVAILABLE COMPRISES DETERMINING THE PREFERRED FND IS IN AN UP STATE AND IS ACTIVE

118 SENDING, BY THE MDC, A REDIRECT MESSAGE TO THE SND TO ASSOCIATE WITH THE PREFERRED FND

METHOD OF REDISTRIBUTING ACCESS POINTS AUTOMATICALLY TO CONTROLLERS FOR RESTORING TOPOLOGY AND BALANCING LOAD

BACKGROUND

Wireless networks have become ubiquitous. A wireless network refers to any type of computer network that is wireless, and is commonly associated with a telecommunications network whose interconnections between nodes is implemented without the use of wires. Wireless telecommunications networks are generally implemented with some type of remote information transmission system that uses electromagnetic waves, such as radio waves, for the carrier and this implementation usually takes place at the physical level or layer of the network.

A wireless network consists of several components. These are WCs (Wireless Controllers), WSs (Wireless Switches), APs (Access Points) and MUs (Mobile Units). An MU is a mobile wireless device like a laptop or a VOIP phone set that communicates with other wired or wireless devices over a wireless network. A wireless AP is a device that allows wireless communication devices (MUs) to connect to wireless and wired networks. A WS receives and switches data traffic sent from several MUs via several APs to the enterprise network A WC handles provisioning, configuration, authentication, load balancing and monitoring of WSs, APs and MUs. The WSs, APs and MUs establish secure control channels to WCs for this purpose and exchange control traffic with it. The Wireless Controllers authenticate WSs, APs, MUs and control the coordination between them to provide a seamless mobile network to the end users. In some cases, the WC and WS functions may be integrated in one device. In such cases, the term MS (Mobility Switch) will be used.

The AP acts as a bridge between the MUs on the wireless side and WSs/WCs present on the wired side. The AP performs authentication, authorization, accounting and load balancing of MUs by communicating with the WC. After obtaining authorization by WC, the AP tunnels MU data traffic into the WS assigned by WC for switching.

A WS switches data traffic originated by MUs into both wired and wireless networks. The wireless switches allow mobile units (e.g. MUs like laptops, cell phones etc.) to roam among various locations and still have network access.

A typical wireless network may include a Mobility Domain (MD). The MD includes one or more Access Points (APs), one or more Wireless Switches (WSs), one or more Wireless Controllers (WCs) and one or more Mobile Units (MUs) and is centrally managed for provisioning, configuration and monitoring. A mobility domain is typically a single geographic area where a same set of mobility services is provided. A mobility domain can include tens of WCs, hundreds of WSs, thousands of APs, and tens of thousands of MUs. MUs can include laptops, cell phones, Personal Digital Assistants (PDAs) and the like.

MUs (like Laptops, VOIP phones etc) associate with an AP, get authenticated and become a part of MD. As they physically roam, they disconnect from one AP in the MD and get attached to another AP in the MD.

Since an AP or a WS sends control traffic to the WC to which it is associated, associating a large number of these entities to a single WC will heavily load the processing power of the WC. Hence when an AP or WS boots up, it contacts a predetermined WC which load balances and distributes these entities to all the WCs in the MD.

Similarly there is need for distributing wireless data traffic from APs (originated by MUs attached to the APs) evenly across the WSs so that no WS is burdened too heavily. This distribution function is also done by the WC that performs the load balancing. Traditionally the APs have been load balanced and assigned to WCs either by way of manual configuration or by using a "round robin" or "least loaded WC" methods without using location information. In cases where WC and WS are deployed as separate devices, there is also need to load balance control channel traffic of both APs and WSs to WCs. In all cases, one designated WC does the load balancing of WSs/APs to WCs, and load balancing of APs to WSs.

In a large enterprise, when WLAN controllers bootup during initial deployment or when they boot up after a power failure, the APs get assigned to controllers that come up early and the AP load distribution across them can be suboptimal. Similarly, when new controllers are added to the enterprise, they will have no load unless some APs are assigned to the new controllers. In such a case, the user may have to intervene and manually reassign APs to controllers to balance the load.

SUMMARY

Conventional mechanisms such as those explained above suffer from a variety of deficiencies. One such deficiency associated with addressing load balancing of wireless environments using manual configuration is that this process is tedious, labor intensive, and as the wireless system becomes large, becomes unwieldy. In addition, the problem of assigning an AP to an alternate controller when the manually configured controller(s) are down (for example due to a hardware failure or due to a power failure) is not addressed. A second deficiency with manual configuration is that it's inability to adjust to the changing environment such as power failure and bringing up of new controllers on line.

Embodiments of the invention significantly overcome such deficiencies and provide mechanisms and techniques that provide for both manual configuration (to assign APs to pre configured controllers) as well as to perform automatic assignment APs to least loaded controllers by load balancing APs. There are two parts to this invention. The first part allows APs in the Mobility Domain (MD) to be reassigned back to their manually configured controllers if they are currently assigned to other controllers. This feature that restores the manual configuration is referred to as redistribute function. The second part to this invention moves APs from most loaded controllers to least loaded ones (without disturbing APs that are already assigned to their manually configured controllers) to balance load across controllers. This feature is known as rebalance function. These two functions can be invoked at any time by the administrator. They can also be invoked periodically to react and adjust to the changing environment and keep the load balanced. They can also be triggered by events like an AP/controller powering up or AP/controller going down.

In a first particular embodiment of a method for restoring topology and load balancing of wireless access points and wireless switches, the method includes receiving a redistribute command at a Mobility Domain Controller (MDC) of a Mobility Domain (MD), the MD including at least one first network device (FND) and at least one second network device (SND). In one instance the FND comprises a Wireless Controller (WC) and the SND comprises one of the group consisting of an Access Point (AP) and a Wireless Switch (WS); while in another instance the FND comprises a WS and the SND comprises an Access Point (AP). The method further includes determining a preferred FND for a SND, determining the SND is not currently associated with the preferred FND, and determining the preferred FND is available. Additionally the method includes sending, by the MDC, a redirect message to the SND to associate with the preferred FND.

In a second particular embodiment, the method includes receiving a rebalance command at a Mobility Domain Controller (MDC) of a Mobility Domain (MD), the MD including at least one first network device (FND) and at least one second network device (SND). In one instance the FND comprises a Wireless Controller (WC) and the SND comprises one of the group consisting of an Access Point (AP) and a Wireless Switch (WS); while in another instance the FND comprises a WS and the SND comprises an Access Point (AP). The method also includes producing a sorted list arranging the FNDs from most heavily loaded to least heavily loaded, determining a load average of all the FNDs and processing the list wherein when a load on a FND is larger than the load average then reducing the load on the FND by moving at least one SND to another FND that is least loaded.

Other embodiments include a computer readable medium having computer readable code thereon for restoring topology of wireless access points and wireless switches. The computer readable medium includes instructions for receiving a redistribute command at a Mobility Domain Controller (MDC) of a Mobility Domain (MD), the MD including at least one first network device (FND) and at least one second network device (SND). In one instance the FND comprises a Wireless Controller (WC) and the SND comprises one of the group consisting of an Access Point (AP) and a Wireless Switch (WS); while in another instance the FND comprises a WS and the SND comprises an Access Point (AP). The computer readable medium further includes instructions for determining a preferred FND for a SND, determining the SND is not currently associated with the preferred FND, and determining the preferred FND is available. Additionally the computer readable medium includes instructions for sending, by the MDC, a redirect message to the SND to associate with the preferred FND.

Another embodiment includes a computer readable medium having computer readable code thereon for performing load balancing of wireless access points and wireless switches. The computer readable medium includes instructions for receiving a rebalance command at a Mobility Domain Controller (MDC) of a Mobility Domain (MD), the MD including at least one first network device (FND) and at least one second network device (SND). In one instance the FND comprises a Wireless Controller (WC) and the SND comprises one of the group consisting of an Access Point (AP) and a Wireless Switch (WS); while in another instance the FND comprises a WS and the SND comprises an Access Point (AP).

The computer readable medium also includes instructions for producing a sorted list arranging the FNDs from most heavily loaded to least heavily loaded, determining a load average of all the FNDs and processing the list wherein when a load on a FND is larger than the load average then reducing the load on the FND by moving at least one SND to another the FND that is least loaded.

Still other embodiments include a computerized device, configured to process all the method operations disclosed herein as embodiments of the invention. In such embodiments, the computerized device includes a memory system, a processor, communications interface and an interconnection mechanism connecting these components. The memory system is encoded with a process for restoring topology and load balancing of wireless access points and wireless switches as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Still other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing load balancing of wireless access points and wireless switches as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which, like reference characters refer to the same parts throughout the different views. The drawings are not necessarily to scale, emphasis instead being placed upon illustrating the principles of the invention.

DETAILED DESCRIPTION

Figure 1:
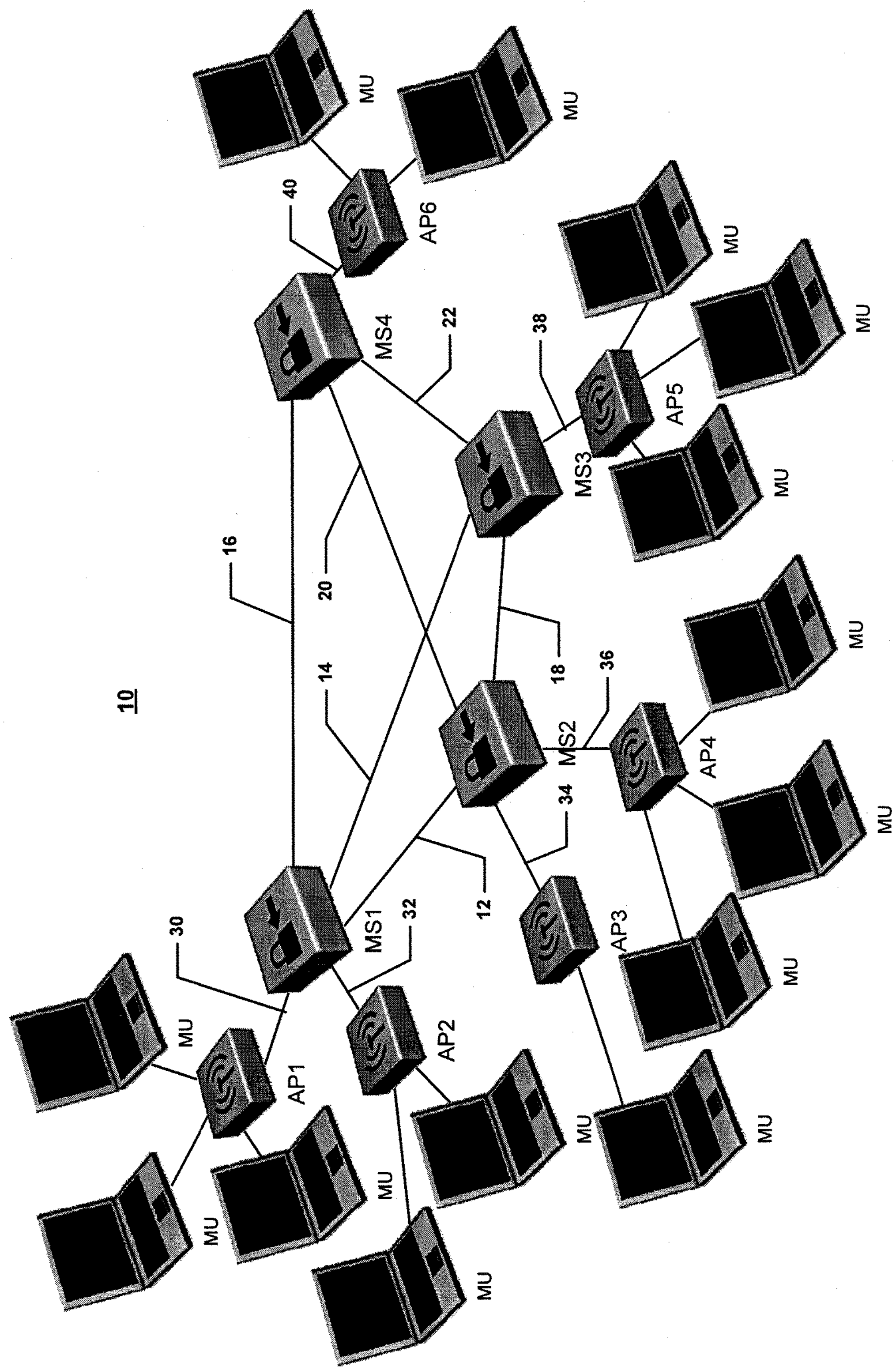
FIG. 1 depicts a block diagram view of an example mobility domain.

Referring to FIG. 1, an example Mobility Domain (MD) 10 is shown. In the description below, a wireless switch (WS) coupled with a wireless controller (WC) integrated into a single device is referred to as Mobility Switch (MS). In this example, the MD 10 includes four mobility switches MS1, MS2, MS3 and MS4, though it should be recognized that typical environments can include hundreds of MSs. The MSs are interconnected in a mesh arrangement by a plurality of mobility tunnels that facilitate switching of wireless data across the data network. Mobility tunnel 12 is provided between MS1 and MS2, mobility tunnel 14 is provided between MS1 and MS3 and mobility tunnel 16 is provided between MS1 and MS4. Mobility tunnel 18 is provided between MS2 and MS3, mobility tunnel 20 is provided between MS2 and MS4 and mobility tunnel 22 is provided between MS3 and MS4.

Mobility domain 10 also includes six APs. An access tunnel is provided between an AP and an MS. Access tunnel 30 is provided between AP1 and MS1 and access tunnel 32 is provided between AP2 and MS1. Access tunnel 34 is provided between AP3 and MS2 and access tunnel 36 is provided between AP4 and MS2. Access tunnel 38 is provided between AP5 and MS3 and access tunnel 40 is provided between AP6 and MS4.

Also shown is a plurality of mobile Units (MUs). Examples of MUs include laptop computers, cellular telephones, Personal Digital Assistants (PDAs) and the like. The MD architecture supports roaming of MUs across MSs. The MUs retain their IP Address in both intra-subnet and inter-subnet roaming scenarios.

When a MU associates to an AP, using an Associate message, the AP will communicate directly with the wireless controller to authenticate this particular client. A specific protocol is used to authenticate the client and at the same time establish his authorization and credentials.

Initially the SNDs become associated with FNDs in a certain configuration. In a large Enterprise, when WLAN controllers bootup during initial deployment, or when they boot up after a power failure the SNDs get assigned to FNDs that come up early and the SND load distribution across them will be suboptimal. Similarly when new controllers are added to the enterprise, they will have no load unless some SNDs are assigned to the new controllers. In such a case, the user may have to intervene and manually reassign SNDs to FNDs to balance the load. In addition, in large scale installations choosing the appropriate SNDs to migrate from one FND to another without significant outages is error prone and is very disruptive to the network. Over time, or after an event such as a power failure, the association of SNDs to FNDs can get somewhat randomly distributed. This undesired distribution of SNDs to FNDs may cause poor performance and definitely makes it hard to monitor and manage. In order to correct this undesired distribution problem, a redistribute command is issued to the MDC which restores the SNDs and FNDs to their original configuration.

Redistribution will move APs to their manually assigned controllers (preconfigured by the user). This guarantees that the user, at any time, can restore the APs and WCs to a preplanned topology. The redistribute algorithm has the following steps. The redistribute command is issued by WMS (Wireless Management System) to the MDC which is a master controller in a cluster of FNDs that are used to manage SNDs and provide wireless service in a large network. The MDC examines each SND that is currently being managed by a FND and if the SND has a preconfigured preferred controller and the SND is not currently attached to the preferred controller and the preferred controller is UP and active, then the MDC sends a redirect message to the SND to join the preferred controller thus making to SND managed by the preferred FND.

Alternately, in a similar scenario wherein the association of SNDs to FNDs becomes randomly distributed a rebalance command is issued to the MDC. The rebalance command is used to move the SNDs from heavily loaded FNDs to lightly loaded FNDs. Rebalancing will move SNDs from the most heavily loaded FNDs to least heavily loaded FNDs and achieve balanced load. The rebalancing will try to achieve the load balancing by either moving SNDs to their preconfigured FND (if configured) or else moving them to the least loaded FND. Rebalancing includes the following steps. The rebalance command is issued by WMS to the MDC. The MDC sorts the FNDs and makes a sorted list that arranges the FNDs from the most heavily loaded to least heavily loaded and computes a load average. The MDC processes the FNDs from the sorted list and if the load on a FND is larger than load average, it tries to reduce the load by moving SNDs to their configured preferred FND when the preferred FND is not the same as current FND, it is in an UP state and has a load less than load average; or it reduces the load by moving SNDs to their configured alternate FND if the alternate FND is not the same as current FND and is in an UP state and has a load less than load average; or it reduces the load by moving other SNDs to least heavily loaded FNDs if there are FNDs with load less than load average.

Both rebalancing and redistribute operations can be initiated and monitored from the Wireless Management System. (WMS). These commands can be repeated until desired load balance is achieved. The redistribute command or the rebalance command can be issued at any time.

Figure 2:
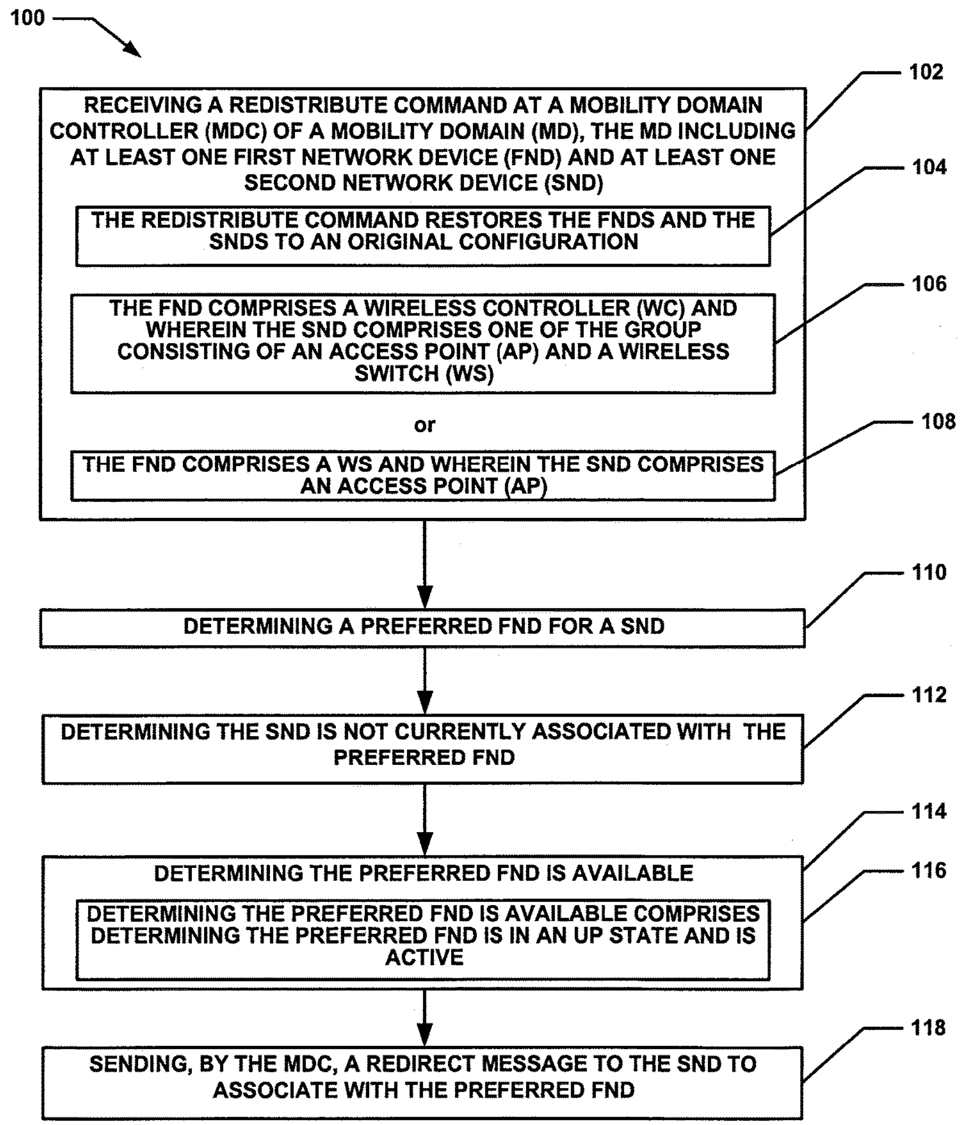
FIG. 2 depicts a flow diagram of a method of restoring topology of wireless access points and wireless switches in accordance with embodiments of the invention.
Figure 3:
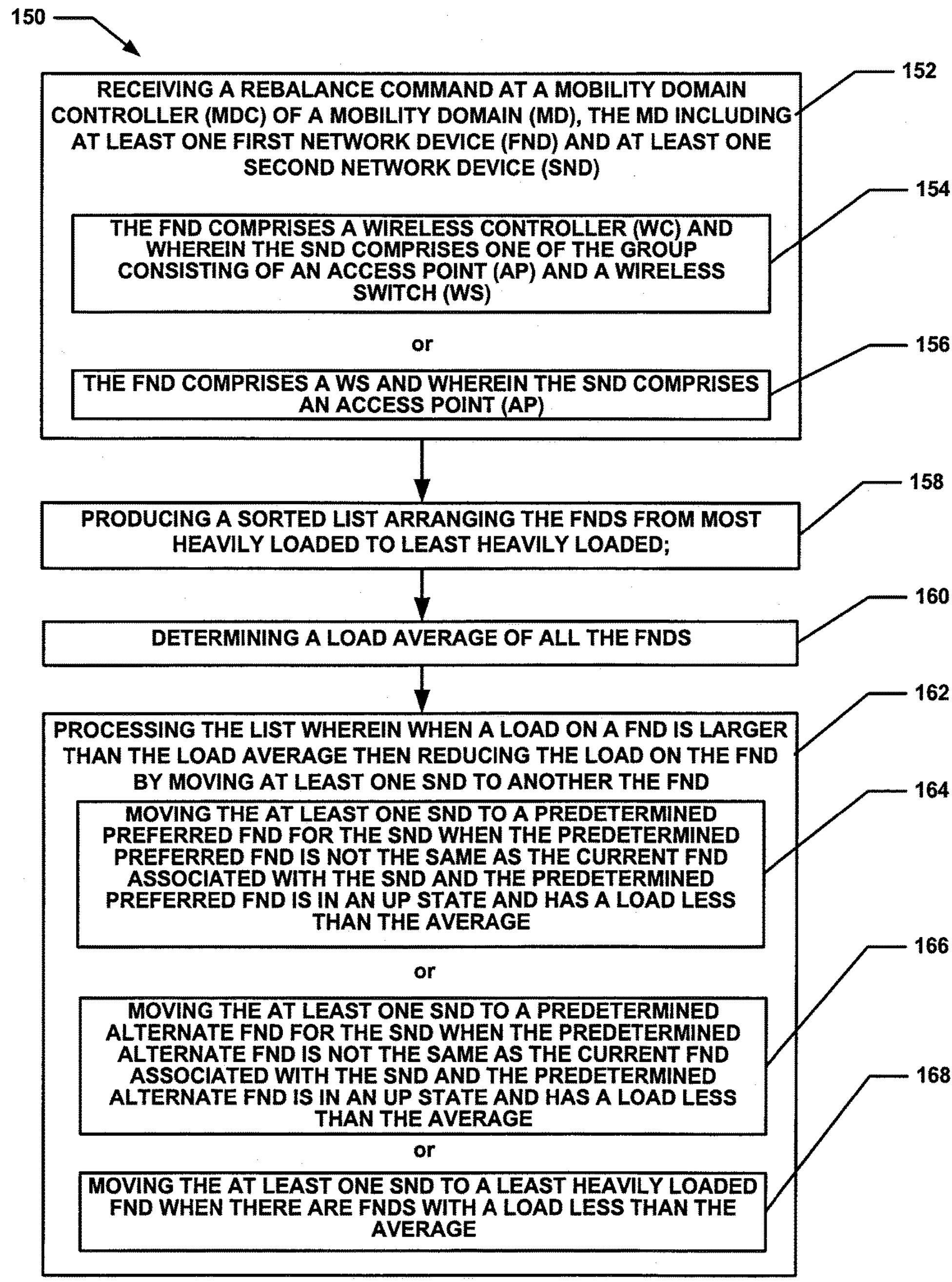
FIG. 3 depicts a flow diagram of a particular method of performing load balancing of wireless access points and wireless switches in accordance with embodiments of the invention.

A flow chart of particular embodiments of the presently disclosed methods is depicted in FIG. 2 and FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information that one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, many of the steps can be performed in an advance or in a parallel fashion.

Referring now to FIG. 2, a particular embodiment of a method 100 for restoring topology is shown. Method 100 starts with processing block 102 which discloses receiving a redistribute command at a Mobility Domain Controller (MDC) of a Mobility Domain (MD), the MD including at least one first network device (FND) and at least one second network device (SND). As recited in processing block 104, the redistribute command restores the FNDs and the SNDs to an original configuration. As further recited in processing blocks 106 and 108, in one embodiment, the FND comprises a Wireless Controller (WC) and wherein the SND comprises one of the group consisting of an Access Point (AP) and a Wireless Switch (WS), while in an alternate embodiment the FND comprises a Wireless Switch (WS) and wherein the SND comprises of an Access Point (AP).

Processing block 110 states determining a preferred FND for a SND. Initially the SNDs become associated with FNDs in a certain configuration.

Processing block 112 recites determining the SND is not currently associated with the preferred FND. Over time, and after an event such as a power failure, the association of SNDs to FNDs may get somewhat randomly distributed. This random distribution of SNDs to FNDs may result in poor performance of parts of the network or may make it more difficult to monitor and manage.

Processing block 114 discloses determining the preferred FND is available. As shown in processing block 116, determining the preferred FND is available comprises determining the preferred FND is in an UP state and is active.

Processing block 118 states sending, by the MDC, a redirect message to the SND to associate with the preferred FND. The MDC redirects the SND to contact the newly assigned FND.

Referring now to FIG. 3, a particular embodiment of the method 150 for providing load balancing is shown. Method 150 starts with processing block 152 which discloses receiving a rebalance command at a Mobility Domain Controller (MDC) of a Mobility Domain (MD), the MD including at least one first network device (FND) and at least one second network device (SND). As recited in processing block 154 and 156, in one embodiment, the FND comprises a Wireless Controller (WC) and wherein the SND comprises one of the group consisting of an Access Point (AP) and a Wireless Switch (WS), while in an alternate embodiment the FND comprises a Wireless Switch (WS) and wherein the SND comprises of an Access Point (AP).

Processing block 158 states producing a sorted list arranging the FNDs from most heavily loaded to least heavily loaded. Processing block 160 recites determining a load average of all the FNDs.

Processing block 162 discloses processing the list wherein when a load on a FND is larger than the load average then reducing the load on the FND by moving at least one SND to another the FND. As further recited in processing block 164, moving at least one SND to another the FND comprises moving the at least one SND to a predetermined preferred FND for the SND when the predetermined preferred FND is not the same as the current FND associated with the SND and the predetermined preferred FND is in an UP state and has a load less than the average. Alternately, as further recited in processing block 166, the moving at least one SND to another the FND comprises moving the at least one SND to a predetermined alternate FND for the SND when the predetermined alternate FND is not the same as the current FND associated with the SND and the predetermined alternate FND is in an UP state and has a load less than the average. Alternately again, the moving at least one SND to another the FND comprises moving the at least one SND to a least heavily loaded FND when there are FNDs with a load less than the average.

As described above, the presently described methods, by use of a single command, allow a user to restore the FNDs and SNDs to a preplanned topology or balance the load on controllers without overriding the manual assignments specified by the user. The above-described methodology for redistributing access points automatically to controllers for restoring topology and balancing load can be stored in computer media and executed on any computer, communication device or hardware unit.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method comprising:

receiving, by a Mobility Domain Controller (MDC) of a Mobility Domain (MD), a redistribute command, wherein:

the MD comprises a plurality of wireless switches (WSs) or wireless controllers (WCs) and a plurality of access points (APs), and each of the plurality of APs is assigned to initially associate with a respective preconfigured one of the WSs or WCs;

determining, by the MDC, the respective preconfigured one of the WSs or WCs for each of the APs;

determining, by the MDC, which of the plurality of WSs or WCs are active;

determining, by the MDC, for each of the APs whether that AP is not currently attached to the respective preconfigured one of the WSs or WCs; and sending, by the MDC, a redirect message to associate with the respective preconfigured one of the WSs or WCs, to each AP that a) is not currently attached to the respective preconfigured one of the WSs or WCs, and b) the respective preconfigured one of the WSs or WCs is active.

2. The method of claim 1, wherein each of the plurality of APs is assigned to associate with a respective preconfigured one of the WSs.

3. A computer-implemented method comprising:

receiving, by a Mobility Domain Controller (MDC) of a Mobility Domain (MD), a rebalance command, wherein:

the MD comprises a plurality of wireless switches (WSs) or wireless controllers (WCs) and a plurality of access points (APs), and each of the plurality of APs is assigned to initially associate with a respective preconfigured one of the WSs or WCs;

determining, by the MDC, the respective preconfigured one of the WSs or WCs for each of the APs;

determining, by the MDC, a respective load value for each of the plurality of WSs or WCs representing how heavily loaded that WS or WC is;

determining, by the MDC, a load average for the plurality of WSs or WCs; and moving, by the MDC, at least one AP associated with a WS or WC with a respective load value greater than the load average to associate with a least heavily loaded one of the WSs or WCs with a respective load value less than the load average.

4. The method of claim 3, comprising:

moving, by the MDC, for a particular one WS or WC, a particular one of the plurality of APs that is currently attached to the particular one WS or WC when:

the respective load value of the particular one WS or WC is larger than the load average, and when the particular one AP is not currently attached to its respective preconfigured one of the WSs or WCs and the respective load value of its respective preconfigured one of the WSs or WCs is less than the load average, wherein the particular one AP is moved back to its respective preconfigured one of the WSs or WCs.

5. The method of claim 3, wherein each of the plurality of APs is assigned to associate with a respective preconfigured, alternate one of the WSs or WCs.

6. The method of claim 5, comprising:

moving, by the MDC, for a particular one WS or WC, a particular one of the plurality of APs that is currently attached to the particular one WS or WC when:

the respective load value of the particular one WS or WC is larger than the load average, and when the particular one AP is not currently attached to its respective preconfigured, alternate one of the WSs or WCs and the respective load value of its respective preconfigured, alternate one of the WSs or WCs is less than the load average, wherein the particular one AP is moved to its respective preconfigured, alternate one of the WSs or WCs.

7. A mobility domain controller (MDC) of a Mobility Domain (MD), comprising:

a memory storing programmable instructions;

a processor in communication with the memory, wherein the processor when executing the programmable instructions, performs:

receiving a redistribute command from a Wireless Management System (WMS), wherein:

the MD comprises a plurality of wireless switches (WSs) or wireless controllers (WCs) and a plurality of access points (APs), and each of the plurality of APs is assigned to initially associate with a respective preconfigured one of the WSs or WCs;

determining the respective preconfigured one of the WSs or WCs for each of the APs;

determining which of the plurality of WSs or WCs are active;

determining for each of the APs whether that AP is not currently attached to the respective preconfigured one of the WSs or WCs; and sending a redirect message to associate with the respective preconfigured one of the WSs or WCs, to each AP that a) is not currently attached to the respective preconfigured one of the WSs or WCs, and b) the respective preconfigured one of the WSs or WCs is active.

8. The MDC of claim 7, wherein each of the plurality of APs is assigned to associate with a respective preconfigured one of the WSs.

9. A mobility domain controller (MDC) of a Mobility Domain (MD), comprising:

a memory storing programmable instructions;

a processor in communication with the memory, wherein the processor when executing the programmable instructions, performs:

receiving a rebalance command from a Wireless Management System (WMS), wherein:

the MD comprises a plurality of wireless switches (WSs) or wireless controllers (WCs) and a plurality of access points (APs), and each of the plurality of APs is assigned to initially associate with a respective preconfigured one of the WSs or WCs;

determining the respective preconfigured one of the WSs or WCs for each of the APs;

determining a respective load value for each of the plurality of WSs or WCs representing how heavily loaded that WS or WC is;

determining a load average for the plurality of WSs or WCs; and moving at least one AP associated with a WS or WC with a respective load value greater than the load average to associate with a least heavily loaded one of the WSs or WCs with a respective load value less than the load average.

10. The MDC of claim 9, wherein the processor when executing the programmable instructions, performs:

moving, for a particular one WS or WC, a particular one of the plurality of APs that is currently attached to the particular one WS or WC when:

the respective load value of the particular one WS or WC is larger than the load average, and when the particular one AP is not currently attached to its respective preconfigured one of the WSs or WCs and the respective load value of its respective preconfigured one of the WSs or WCs is less than the load average, wherein the particular one AP is moved back to its respective preconfigured one of the WSs or WCs.

11. The MDC of claim 9, wherein each of the plurality of APs is assigned to associate with a respective preconfigured, alternate one of the WSs or WCs.

12. The MDC of claim 11, wherein the processor when executing the programmable instructions, performs:

moving, for a particular one WS or WC, a particular one of the plurality of APs that is currently attached to the particular one WS or WC when:

the respective load value of the particular one WS or WC is larger than the load average, and when the particular one AP is not currently attached to its respective preconfigured, alternate one of the WSs or WCs and the respective load value of its respective preconfigured, alternate one of the WSs or WCs is less than the load average, wherein the particular one AP is moved to its respective preconfigured, alternate one of the WSs or WCs.

* * * * *